United States Patent [19]

Castleberry et al.

[11] 4,142,183
[45] Feb. 27, 1979

[54] DRAW/DISPLAY MEANS

[76] Inventors: Clarence F. Castleberry, Rte. 2, Box 481, Brighton, Tenn. 38011; Michael F. Castleberry, 6678 Norde Dr., S., Jacksonville, Fla. 32210

[21] Appl. No.: 797,356

[22] Filed: May 16, 1977

[51] Int. Cl.² .............................................. G08B 5/36
[52] U.S. Cl. .................................... 340/706; 340/782; 340/365 R
[58] Field of Search ......... 340/166 EL, 365 R, 365 S, 340/365 C, 337; 178/18, 20

[56] References Cited

U.S. PATENT DOCUMENTS

| 546,799 | 9/1895 | Woodbridge | 340/337 |
| 3,559,307 | 2/1971 | Barrekette et al. | 340/337 X |
| 3,932,862 | 1/1976 | Graven | 178/18 X |

Primary Examiner—David L. Trafton
Attorney, Agent, or Firm—John R. Walker, III

[57] ABSTRACT

A plurality of lights are mounted on the face of a board-like member. An electrical conductive contact member is mounted on the face of the board-like member adjacent each of the plurality of lights. Each contact member is electrically coupled to the light it is adjacent to through an electric circuit which causes the light to light up when a positive electrical pulse is received by the contact member. A positive electric probe or stylus member is provided for allowing positive electrical pulses to be applied to selective ones of contact members to light up selective ones of the plurality of lights.

4 Claims, 4 Drawing Figures

DRAW/DISPLAY MEANS

BACKGROUND OF THE INVENTION

1. Field of the Invention

This invention relates to stylus actuated electrical devices which allow a drawing or written message to be formed by causing selective ones of a plurality of lights to light up.

2. Description of the Prior Art

The following U.S. patents relate generally to the field of the present invention: Romero, U.S. Pat. No. 3,019,425; Romero, U.S. Pat. No. 3,128,458; and Barish, U.S. Pat. No. 3,914,548. In the above patents, a stylus or the like is used to complete an electric circuit by either depositing electrically conductive material between two open points of the circuit (e.g., the two Romero patents) or manually moving an electrical insulative material from between two points of the circuit (e.g., the Barish patent).

The following U.S. patents may be of interest to persons desiring to make and/or use the present invention: Tarbox, U.S. Pat. No. 1,965,206; Bowers, U.S. Pat. No. 1,973,305; Bowers, U.S. Pat. No. 2,006,436; Rufle, U.S. Pat. No. 2,210,382; Rufle, U.S. Pat. No. 2,471,902; Christy, U.S. Pat. No. 3,443,332; Barrekette et al., U.S. Pat. No. 3,559,307; Reed, U.S. Pat. No. 3,573,792; Dertouzos, U.S. Pat. No. 3,705,956; Miller, U.S. Pat. No. 3,887,767; Barish, U.S. Pat. No. 3,894,183; Graven, U.S. Pat. No. 3,932,862; Murase et al., U.S. Pat. No. 3,944,740; and Carvey, U.S. Pat. No. 3,975,592. None of the above patents disclose or teach the present invention.

SUMMARY OF THE INVENTION

The present invention is directed towards providing means which allows a person to draw or write using only electrical pulses, i.e., without depositing or displacing any substance such as lead, ink, electrically conductive material, or electrically insulative material. The concept of the present invention is to provide a draw/display means which forms a drawing or written message by lighting selective ones of a plurality of lights when a positive electric probe means is passed over selective ones of a plurality of electrically conductive contact means.

The draw/display means of the present invention includes, in general, a board means having an exterior face; a plurality of light means mounted on the face of the board means; a plurality of electrically conductive contact means, each of the contact means being mounted on the face of the board means adjacent one of the light means and being electrically coupled to the adjacent light means; a plurality of electrical responsive means for activating the light means in response to a positive electrical pulse being received by the contact means each of the electrical responsive means being electrically coupled to one of the contact means and to the light means that is adjacent that contact means for causing the light means to be activated when a positive electrical pulse is received by that contact means; and a positive electric probe means for selectively applying positive electrical pulses to selective ones of the contact means to activate selective ones of the light means.

DESCRIPTION OF THE PREFERRED EMBODIMENT

Figure 1:
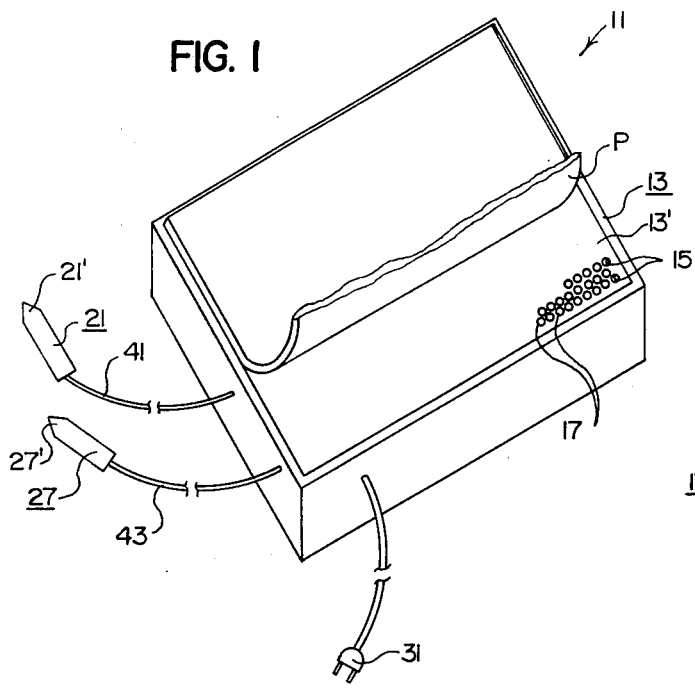
FIG. 1 is a perspective view of the draw/display means of the present invention showing certain portions thereof broken away for clarity, showing only a limited number of the light means and contact means for clarity, and showing a sheet of light sensitive paper being placed thereon.

The draw/display means 11 of the present invention allows a person to draw and/or write, using only positive electric pulses. The draw/display means 11 includes, in general, a board means 13, a plurality of light means 15, a plurality of electrically conductive contact means 17, a plurality of electrical responsive means 19, and a positive electric probe means 21.

The board means 13 includes an exterior face 13'. The exterior face 13' is preferably substantially flat (see FIGS. 1 and 3) for allowing the user of the draw/display means 11 to draw and/or write thereupon. Additionally, the face 13' of the board 13 is preferably of a size that will accommodate standard sizes of light sensitive paper P (see FIG. 1) for reasons which will hereinafter become apparent. At least the face 13' of the board means 13 is constructed of an electrically non-conductive material. The board means 13 may be constructed in any manner apparent to those skilled in the art and may be constructed so as to substantially contain or hold other elements of the draw/display means 11 as shown in FIG. 1.

Figure 3:
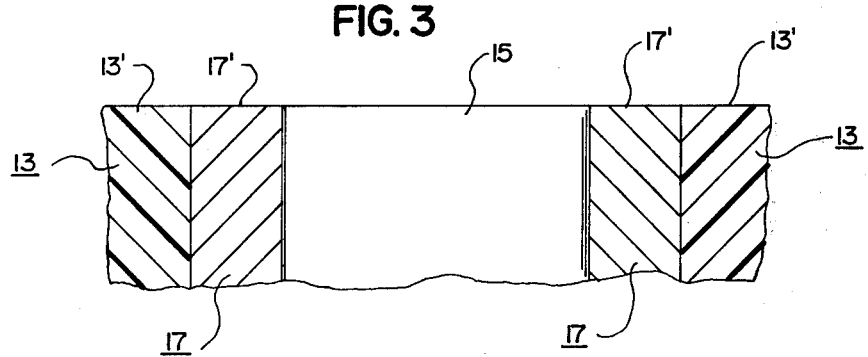
FIG. 3 is an enlarged sectional view of a portion of the draw/display means of the present invention.

Each of the plurality of light means 15 are mounted on the face 13' of the board means 13 (see FIGS. 1 and 3). The light means 15 are preferably mounted flush with the face 13' of the board means 13 so as not to interrupt the substantially flat face 13' (see FIG. 3). The light means 15 are preferably highly concentrated over the face 13' of the board means 13. For example, the draw/display means 11 preferably includes at least one hundred light means 15 per square inch of the face 13' of the board means 13. The light means 15 may consist of any adequate means which produces light in response to electric power. Preferably, each light means 15 consists of a well-known light emitting diode.

Figure 2:
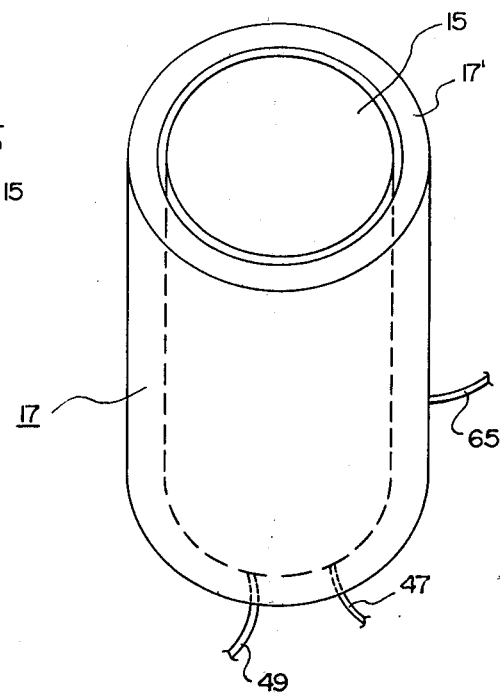
FIG. 2 is an enlarged perspective view of a light means and contact means of the draw/display means of the present invention shown removed from the board means thereof for clarity.

Each of the plurality of electrically conductive contact means 17 is mounted on the face 13' of the board means 13 adjacent one of the light means 15 (see FIGS. 1, 2 and 3). Preferably, each contact means 17 is mounted with the face 17' thereof flush on the face 13' of the board means 13 so as not to interrupt the substantially flat face 13' (see FIG. 3). Each of the contact means 17 is electrically coupled to the light means 15 that it is adjacent (see FIG. 4) in a manner and for reasons which will hereafter become apparent. Each of the contact means 17 is preferably ring-shaped as clearly shown in FIG. 2. Each of the light means 15 is preferably positioned within one of the ring-shaped contact means 17 and preferably substantially fills the inside of the face 17' of each ring-shaped contact means 17 as shown in FIG. 2.

The plurality of electrical responsive means 19 are adapted to activate the light means 15 in response to a positive electrical pulse being received by the contact means 17. Each of the electrical responsive means 19 is electrically coupled to one of the contact means 17 and to the light means 15 that is surrounded by the contact means 17 (see FIG. 4) for causing the light means 15 to be activated when a positive electric pulse is received by that contact means 17 in a manner which will hereafter become apparent. Each of the electrical responsive means 19 preferably includes a bi-stable multi-vibrator means such as a well-known RTS flip-flop 23 (see FIG. 4). Each electrical responsive means 19 also preferably includes a driver means 25 for activating the light means 15 in response to the flip-flops 23. The driver means 25 preferably consists of a transistor such as a standard bi-polar transistor, a unipolar transistor, or a field effect transistor.

The positive electric probe means 21 is adapted to selectively apply positive electrical pulses to selective ones of the contact means 17 so as to activate selective ones of the light means 15. The positive electric probe means 21 is preferably formed in a shape similar to a standard pen or pencil having a substantially pointed end 21' for being used to draw and/or write on the face 13' of the board means 13 in substantially the same way as a normal pen or pencil and without ink or lead. The positive electrode probe means 21 is charged with positive electric power in any manner apparent to those skilled in the art such as by being electrically coupled to a source of positive electric power.

The draw/display means 11 preferably includes a negative electric probe means 27 for selectively applying negative electrical pulses to selective ones of the contact means 17 to deactivate selective ones of the light means 15. The negative electric probe means 27 is preferably formed in a shape similar to a standard pen or pencil having a substantially pointed end 27' for being used in substantially the same way as a normal pen or pencil and without ink or lead. The negative electric probe means 27 is charged with negative electric power in any manner apparent to those skilled in the art such as by being electrically coupled to a source of negative electric power.

Figure 4:
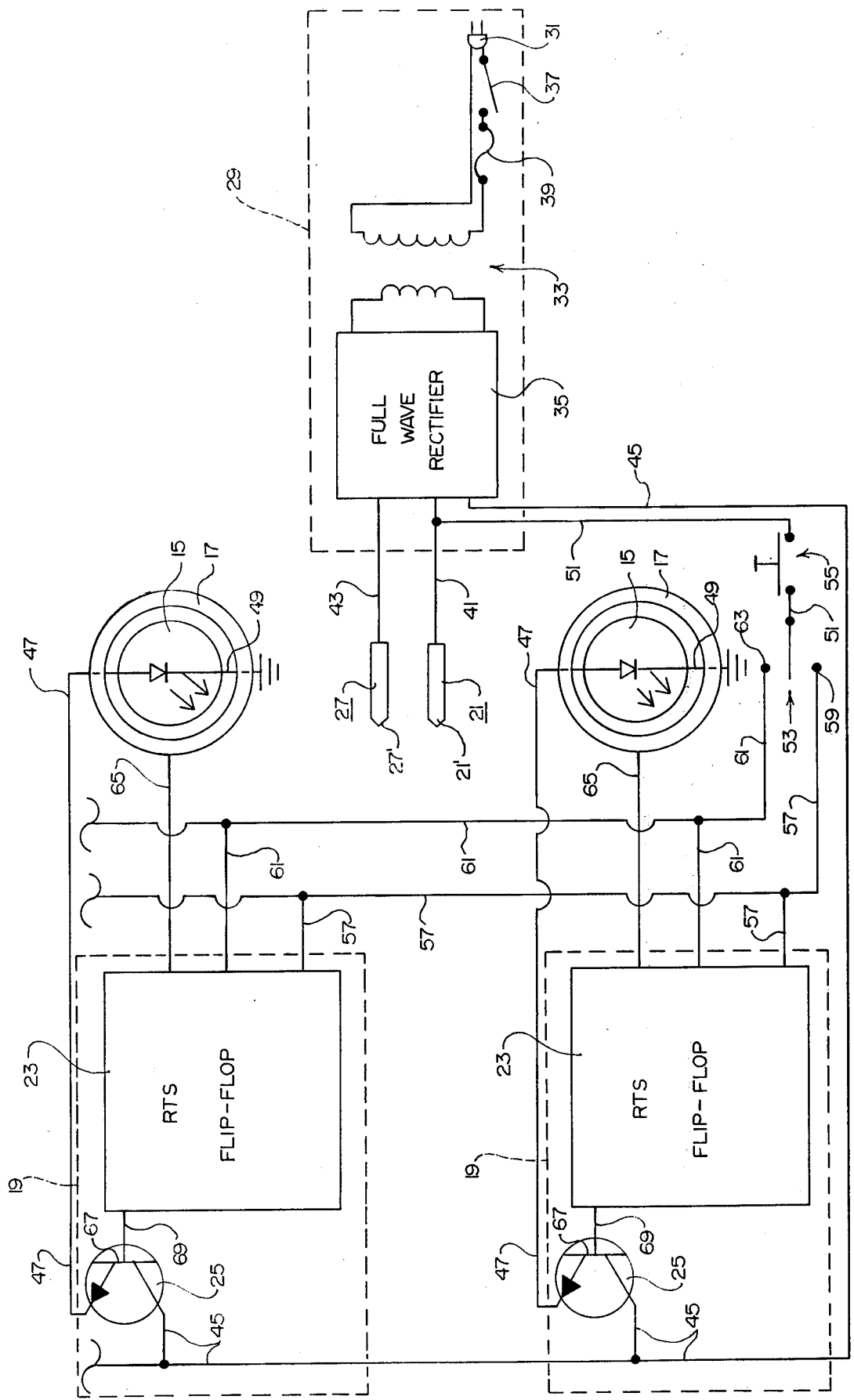
FIG. 4 is an electrical schematic view of the draw/display means of the present invention.

The draw/display means 11 preferably includes an electric power supply means 29 for providing positive electric power to the positive electric probe means 27, for providing negative electric power to negative electric probe means 27, and for providing electric power to the driver means 25 of each electrical responsive means 19. The electric power supply means 29 may consist of any adequate electric power supply means apparent to those skilled in the art. For example, the electric power supply means 29 may include a standard plug 31 or the like for selectively making electrical contact with a standard alternating current electrical outlet, a step-down transformer 33 for reducing the voltage of the alternating current conducted by the plug 31, and a full-wave rectifier 35 for changing the alternating current conducted by the plug 31 to direct current. A master switch 37 and a fuse 39 may be incorporated in the electric power supply means 29 as shown in FIG. 4 for reasons which will be apparent to those skilled in the art.

The elements of the draw/display means 11 may be electrically coupled together in any manner apparent to those skilled in the art. For example, an electrical conductor 41 (i.e., a length of flexible electrically conductive wire or the like) may extend from the rectifier 35 to the positive electric probe means 21 to convey positive electric power thereto. Another electric conductor 43 may extend from the rectifier 35 to the negative electric probe means 27 to convey negative electric power thereto. Another electrical conductor 45 may extend from the rectifier 35 to the driver means 25 of each of the electrical means 19 to convey electric power thereto. An electrical conductor 47 may extend from the driver means 25 of each electrically responsive means 19 to the associated light means 15 to convey positive electric power thereto. An electrical conductor 49 may extend from each light means 15 to ground for allowing electric power to pass through the light means 15 from electrical conductors 47.

The draw/display means 11 may include a circuit means electrically coupled to the power supply means 29 for selectively causing all of the light means 15 to be deactivated and for selectively causing all of the light means 15 that were activated to be deactivated while causing all of the light means 15 that were deactivated to be activated. Such a circuit means may include an electrical conductor 51 extending from the rectifier 35 or the electrical conductor 41 to a single-pole, double-throw switch 53. A normally open, momentary or spring return push-button-type switch 55 or the like may be mounted in the electrical conductor 51 between the rectifier 35 and the switch 53. An electrical conductor 57 may pass from one contact 59 of the switch 53 to the reset input of the RTS flip-flop 23 of each electrical responsive means 19 for causing all the light means 15 to be deactivated when the switch 53 is closed across the contact 59 and the switch 55 is closed in a manner well known to those skilled in the art. Another electrical conductor 61 may pass from another contact 63 of the switch 53 to the toggle input of the RTS flip-flop 23 of each electrical responsive means 19 for causing the light means 15 that were activated to be deactivated while causing all the light means 15 that were deactivated to be activated when the switch 53 is closed across the contact 63 and the switch 55 is closed, in a manner well known to those skilled in the art.

The operation of the draw/display means 11 of the present invention is quite simple. When the plug 31 is electrically coupled to a standard electric outlet and the master switch 37 is closed, selective light means 15 can be activated, or lit up, by touching the contact means 17 that surrounds the light means 15 to be activated with the positive electric probe means 21. This causes positive electric power to pass through an electrical conductor 65 from the contact means 17 to the set input of the RTS flip-flop 23 of each electrical responsive means 19. The positive electric power will then pass through the RTS flip-flop 23 to the base 67 of the transistor of the driver means 25 by way of an electrical conductor 69. Once the positive electric power is received by the base 67, the driver means 25 will allow positive electric power to pass therethrough from the electrical conductor 45, through the electrical conductor 47 and to the light means 15 thereby activating or lighting up the light means 15. It should be noted that the light means 15 so activated will remain activated, or lit up, until the associated contact means 17 is touched with the negative electric probe means 27, or until the switch 55 is closed with the switch 53 closed across either the contact 59 or the contact 63. If it is desired to deactivate any light means 15 so activated, the contact means 17 that surrounds that light means 15 is merely touched with the negative electric probe means 27. If, on the other hand, it is desired to deactivate all the light means 15 so activated, rather than touching each of the contact means 17 that surround each of the activated light means 15 with the negative electric probe 27, the switch 53 may be closed across the contact 59 and the switch 55 may be momentarily closed as heretofore discussed. Also, if it is desired to cause each of the light means 15 that were so activated to be deactivated while causing each of the light means 15 that were not so activated to be activated, the switch 53 may be closed across the contact 63 and the switch 55 may be momentarily closed as heretofore discussed. Additionally, it should be noted that if a photographic copy or the like is desired of the drawing and/or writing formed by the activated light means 15, a sheet of light sensitive paper P may merely be placed over the face 13' of the board means 13 in a manner as will be apparent to those skilled in the art.

Although the invention has been described and illustrated with respect to a preferred embodiment thereof, it is not to be so limited since changes and modifications may be made therein which are within the full intended scope of the invention.

I claim:

1. A draw/display means comprising:
    (a) a board means having an exterior face;
    (b) a plurality of electrically conductive contact means, each of said contact means being ring-shaped and being mounted on said face of said board means;
    (c) a plurality of light means mounted on said face of said board means adjacent one of said contact means and being electrically coupled to said adjacent contact means, each of said light means being positioned within one of said ring-shaped contact means;
    (d) a plurality of electrical responsive means for activating said light means in response to an electrical pulse being received by said contact means, each of said electrical responsive means being electrically coupled to one of said contact means and to said light means that is adjacent said one of said contact means for causing said adjacent light means to be activated when an electric pulse is received by said one of said contact means; and
    (e) a first electric probe means for selectively applying electrical pulses to selective ones of said contact means to activate selective ones of said light means.

2. The draw/display means of claim 1 in which each of said light means substantially fills the inside of each of said ring-shaped contact means.

3. A draw/display means comprising:
    (a) a board means having a substantially flat face;
    (b) a plurality of light emitting diodes mounted on said face of said board means;
    (c) a plurality of substantially ring-shaped electrically conductive contact means, each of said contact means being mounted on said face of said board means around one of said light emitting diodes and being electrically coupled to said light emitting diode which it is positioned around;
    (d) a plurality of electrically responsive means for activating said light emitting diodes in response to a positive electric pulse being received by said contact means, each of said electrical responsive means being electrically coupled to one of said contact means and to said light emitting diode that is surrounded by said one of said contact means for causing said light emitting diode to be activated when a positive electric pulse is received by said one of said contact means, each of said electrically responsive means including a bi-stable multi-vibrator means for receiving electrical pulses from said contact means and including a driver means for activating said light-emitting diodes when said bi-stable multi-vibrator receives a positive electric pulse from said contact means;
    (e) a positive electric probe means for selectively applying positive electrical pulses to selective ones of said contact means to activate selective ones of said light emitting diodes;
    (f) a negative electric probe means for selectively applying negative electrical pulses to selective ones of said contact means to deactivate selective ones of said light emitting diodes;
    (g) an electric power supply means electrically coupled to said positive electric probe means, said negative electric probe means, and each of said electrically responsive means for providing positive electric power to said positive electric probe means, for providing negative electric power to said negative electric probe means, and for providing electric power to said driver means of each of said electrically responsive means; and
    (h) circuit means electrically coupled to said power supply means for selectively causing all of said light emitting diodes to be deactivated and for selectively causing all of said light emitting diodes that were activated to be deactivated while causing all of said light emitting diodes that were deactivated to be activated.

4. The draw/display means of claim 3 in which said bi-stable multi-vibrator means of each of said electrical responsive means consist of a RTS flip-flop, and in which said driver means of each of said electrically responsive means includes a transistor.

* * * * *